Figure 1:
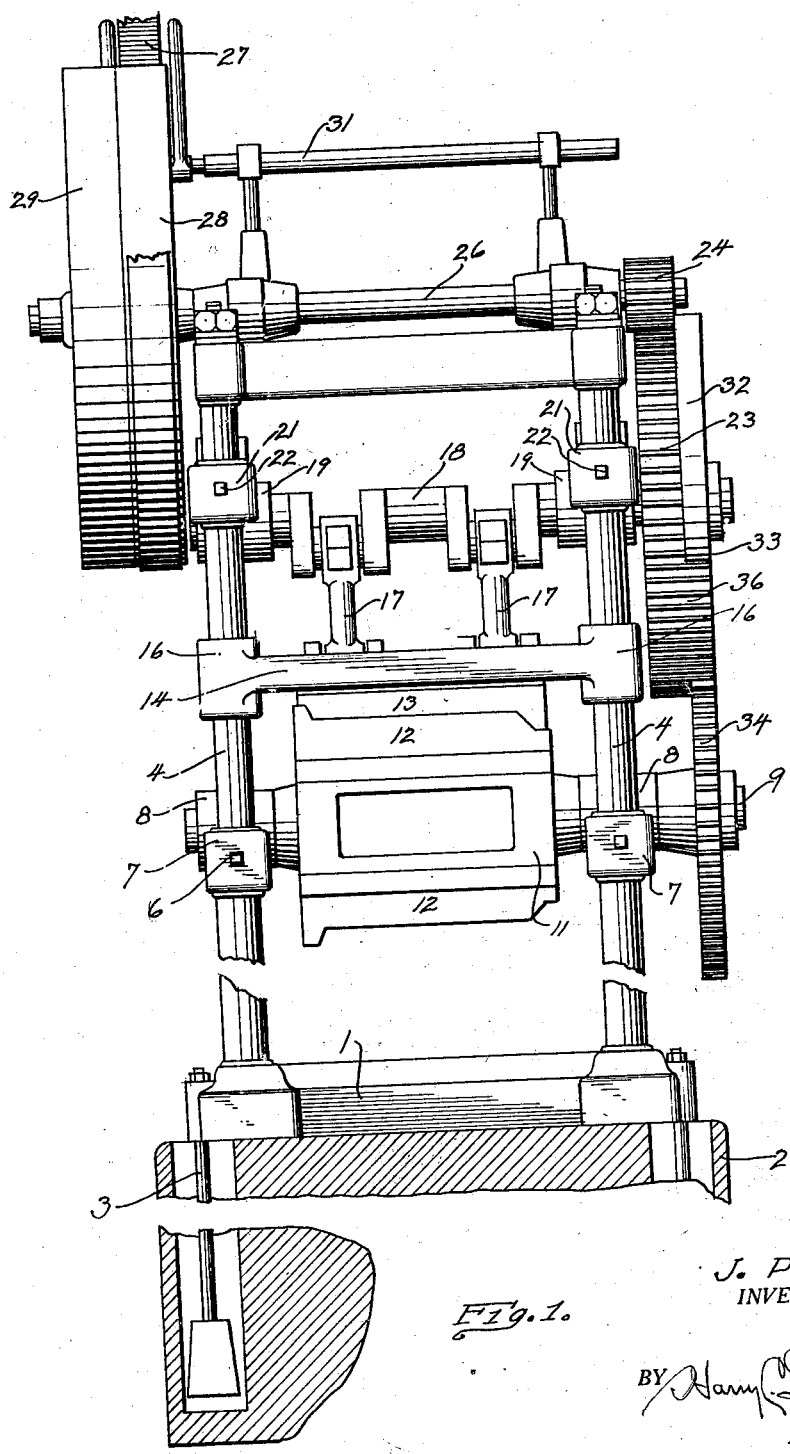

June 24, 1930. J. PESSAGNO 1,765,847
TILE MOLDING MACHINE
Filed Jan. 4, 1927 2 Sheets-Sheet 1

J. PESSAGNO.
INVENTOR

BY Harry Schroeder
ATTORNEY

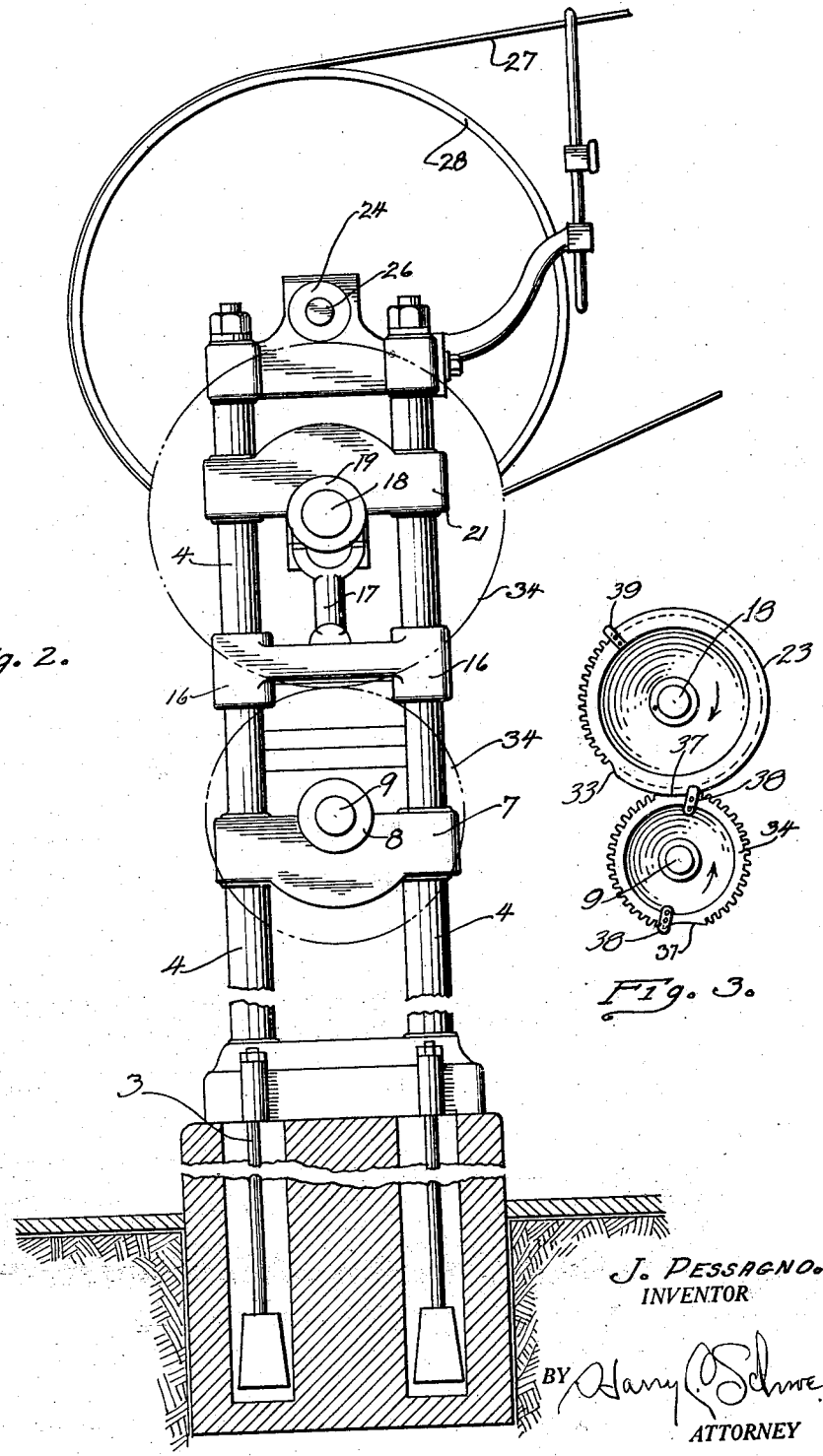

Patented June 24, 1930

1,765,847

UNITED STATES PATENT OFFICE

JOSEPH PESSAGNO, OF OAKLAND, CALIFORNIA

TILE-MOLDING MACHINE

Application filed January 4, 1927. Serial No. 158,869.

The present invention relates to improvements in a tile molding machine, and its particular object is to provide a machine for molding tiles, which is simple in character and in which tiles may be molded with great speed. It is particularly proposed to provide, in this machine, a revolvably mounted mold section and a reciprocating mold section complementary thereto and cooperating therewith, the two mold sections being arranged and their motions being timed so that the revolving mold section comes to rest in operative relation to the reciprocating mold section at stated times for effecting a molding operation. It is further proposed to provide improved means for imparting intermittent rotary motion to the revolvable mold section. It is further proposed to provide certain mounting means for both sections which insure perfect alinement and perfect cooperation. Further objects and advantages of my invention will appear as the specification proceeds.

The preferred form of my invention is illustrated in the accompanying drawing in which—

Figure 1 shows a front view of my molding machine,

Figure 2 a side elevation thereof, and

Figure 3 a detail view of two cooperating gears arranged to allow intermittent rotary motion to be transmitted from one to the other.

While I have shown only the preferred form of the invention, I wish to have it understood that various changes or modifications may be made within the scope of the claims hereto attached without departing from the spirit of the invention.

My machine is mounted on a frame comprising a base 1 suitably mounted on a concrete foundation 2 and anchored thereto in any suitable manner by the bolts 3. From this base rise four posts or columns 4 arranged to form a rectangle. On these posts are supported, with freedom of vertical adjustability by means of set screws 6, two frames 7 supporting in bearings 8 a horizontal shaft 9 having fixed thereto, between said frames, the casing 11 of suitable form carrying, on diametrically opposite faces, the mold sections 12 which are of similar construction and are made for cooperation with a complementary mold section 13 mounted for reciprocating motion. The latter mold section is supported in a horizontal frame 14 slidable on all four posts as shown at 16 and is reciprocated by means of rods 17 connecting to the crank shaft 18 supported in bearings 19 arranged in frame 21 mounted on the posts 4 with freedom of vertical adjustability by means of set screws 22. Revolving motion is imparted to the crank shaft by means of a gear wheel 23 fixed thereto and meshing with a pinion 24 on a shaft 26 surmounting the frame structure, the latter shaft receiving rotary motion from the belt 27 actuating the wheel 28 mounted on the shaft 26. The belt 27 may be moved over to an idler wheel 29 by means of the mechanism 31, well known in the art.

The teeth of the gear wheel 23 meshing with the teeth of the pinion 24 do not extend thru the entire width of the wheel thruout the circumference thereof, but leave a section 32 equal in length to about three-quarters of the circumference and of any suitable width approaching preferably one-half of the entire width of the gear wheel unoccupied by gear teeth. This section, however, is raised so as to be on line with the top of the gear teeth instead of with the base thereof. Where this section 32 joins the tooth section at the end thereof, the surface of the wheel rises as shown at 33. A gear wheel 34 on the shaft 9 is arranged to mesh with a section of the gear wheel 23 equal in width to the section 32 so as to alternately engage with a toothed portion 36 and the smooth portion 32. The gear wheel 34 is also mutilated by omission of a few teeth at diametrically opposed places as shown at 37 and at these places, the surface of the wheel is dished, the arc of the dish corresponding in shape to the arc of the smooth section 32 on the gear wheel 23. The toothed sections of the gear wheel 34 between the dished sections correspond in length to the toothed section 36 of the gear wheel 23 so that when the latter gear wheel rotates, the toothed section 36 drives one toothed section of the gear wheel 34 until the end of both toothed sections is reached whereupon the smooth section 32 rides in the dished section 37 of the gear wheel 34 whereby the latter gear wheel is prevented from rotary motion. To cause engagement of the teeth at the end of each rest period, I provide lugs 38 fixed to the face of the gear wheel 34 and extending beyond the periphery thereof at the rear end of each dished section and a similar lug 39 extending from the gear wheel 23 at the rear end of its smooth section. It will thus be seen that for each revolution of the wheel 23, the wheel 34 makes a one-half revolution which occupies about one-quarter of the time of the revolution of the gear wheel 23, while the wheel 34 stands still during three-quarters of the revolution of the larger gear wheel. The position of the casing 11 on the shaft 9 is arranged so that when the shaft 9 is at rest, one of the mold sections 12 is presented on top in operative relation to the complementary mold section 13.

The operation of my improved tile molding machine is as follows. Molding material which is preferably presented to the operator by other machinery in the form of a slab is placed on the mold section 12 while the latter is in motion and is ascending the last quarter of the circle, bringing it to the top. When the mold section is presented on top, the complementary mold section 13 descends upon the same and presses the material into form. The section 13 thereupon rises again and the shaft 9 goes thru another half revolution, during which the upper mold section 12 drops the tile formed therein, while the lower mold section 12 ascends into operative relation relative to the reciprocating mold section 13. The thickness of the article to be molded may be adjusted by setting the frame 7 by means of the set screws 6. It will be noted that the upper mold section 13 is firmly guided in its course by the frame 16 which slides on the posts 4. The lower mold sections 12 on the casing 11 are firmly held at rest by the engagement of the smooth section 32 with the dished section 37 on the gear wheel 34 so that both molds are positioned during each performance with perfect accuracy.

I claim:

1. A tile molding machine having two co-acting mold sections, means for reciprocating one of the said sections and mutilated gears having co-acting lugs for revolving the other section intermittently and in timed relation to the reciprocation of the first named section.

2. A tile molding machine having a revolvably mounted mold section, mutilated gears having lugs extending beyond their periphery for throwing the teeth of the gears into mesh for intermittently revolving the same and causing it to come to rest during each revolution at a pre-determined point, a second mold section which cooperates with the first mold section and means for reciprocating the same and causing it to contact with the revolvable section when the revolvable section is at rest.

3. A tile molding machine having a revolvable mounted element with mold sections disposed on a plurality of its faces, mutilated gears having means for throwing the teeth of the respective gears into mesh at pre-determined intervals for intermittently revolving the element causing the sections to successively come to rest at a pre-determined point of the revolution of said element, a complementary mold section for cooperating with either of the sections and means for timing the contacts in such manner as to cause the reciprocal element to contact with the revolvable element when the latter is at rest.

4. A tile molding machine having a plurality of standards, a frame carried by the standards, a revolvable frame supported by the standards, molds on the face of the revolvable frame, mutilated gears, having co-acting lugs, for revolving the frame intermittently and causing the same to come to rest when the molds lie in a pre-determined position, a second frame supported by the columns provided with a complementary mold section and capable of reciprocal vertical movement of the standards in timed relation with the revolution of the revolvable frame.

5. A tile molding machine, a revolvably mounted mold section and means for imparting intermittent rotary motion to the section, said means comprising a mutilated gear wheel mounted co-axial with the mold section, a portion of the periphery of said gear wheel having a dished toothless surface and a mutilated revolving gear wheel meshing therewith having a portion of its peripheral face toothless, said gears having lugs extending beyond their peripheries.

6. A tile molding machine, a revolvably mounted mold section and means for imparting intermittent rotary motion thereto comprising two intermeshing mutilated gear wheels, one having a smoth face along the peripheral line of its teeth for a portion of the periphery thereof and the other having a complementary dished surface adapted to receive the smooth portion of the first named gear wheel during part of its travel, said gear wheels having co-acting lugs affixed to the side faces thereof and adapted to throw the gears into mesh when the smooth portion of the first named gear passes out of the dished portion of the last named gear.

7. A tile molding machine having a supporting frame comprising four supporting columns, a crank shaft journaled in the frame, a frame capable of reciprocal movement on the columns below the crank shaft and operably related thereto, a mold carried by the under side of the reciprocal frame, a rotatable shaft secured to the columns below the reciprocal frame, a mold section affixed to the shaft having molds affixed to its diametrically opposite faces, intermeshing mutilated gear wheels journaled in the frame for imparting intermittent revolution to the mold frame carrying shaft and means for rotating the multilated gears.

8. A tile molding machine having a frame comprising four standards, a crank shaft journaled in the frame adjacent the upper end thereof, a mold carrying frame provided with collars surrounding the standards and capable of longitudinal reciprocal movement thereon and operably related to the crank shaft, a shaft journaled in the frame and below the crank shaft, a mold supporting frame affixed to the last named shaft, molds on the diametrically opposite faces of the mold supporting frame, mutilated gears for imparting intermittent rotation to the mold carrying frame and means for rotating the mutilated gears.

In testimony whereof I affix my signature.

JOSEPH PESSAGNO.